United States Patent Office 3,247,242
Patented Apr. 19, 1966

3,247,242
REMOVAL OF INHIBITORS FROM ETHYLENICALLY UNSATURATED MONOMERS
Francis X. McGarvey, Haddon Heights, N.J., and Vincent C. Meunier, Ambler, and Frank X. Pollio, Philadelphia, Pa., assignors to Rohm & Haas Company, Philadelphia, Pa., a corporation of Delaware
No Drawing. Filed Aug. 9, 1962, Ser. No. 215,769
5 Claims. (Cl. 260—486)

This application is a continuation-in-part of Serial No. 198,760, filed May 31, 1962, which has been abandoned.

This process concerns the removal of inhibitors from alkenyl monomers by contacting said monomers with a salt form of an anion exchange resin which has a macroreticular structure as hereinafter defined. A modification of the present invention not only effects inhibitor removal, but results in dehydration of the ethylenically unsaturated monomer.

In the prior art, it is shown to remove inhibitors by washing with caustic, but this frequently results in emulsification, causing difficulties in the separation of the uninhibited monomer. Distillation of the monomer also removes the inhibitor, but is expensive and polymerization of the monomers may occur. In some cases, depending on the end use, the presence of the inhibitor is compensated for by adding enough catalyst to destroy the inhibitor and still permit polymerization of the monomer or monomer mixtures. However, particularly in the preparation of transparent optically clear sheets, many of these inhibitors must be removed prior to polymerization, because they cause discoloration of the polymer. Furthermore, again particularly in the case of optical grade transparent sheets, it is important that the monomer be as dry as possible because otherwise haze and discoloration can result.

U.S. 3,017,426 discloses the use of a quaternary anion exchanger in the free base form for the removal of inhibitors from alkenyl monomers, but the critical aspects of this invention are concerned with the water content of the resin as well as the water content of the monomer. Thus, the resin should contain between 40% and 60% by weight of water, preferably between 45% and 55% by weight of water, and the inhibited alkenyl monomer must contain water between 100 and 700 p.p.m. Thus, for many purposes, particularly applications described hereinbefore, an additional step of drying is required after inhibitor removal. Furthermore, the relative instability of the free base form of quaternary anion exchangers when compared to the salt forms is well-known.

Surprisingly, it has been found that the so-called "salt" form of a macroreticular-structured quaternary anion exchange resin will remove phenolic type inhibitors from ethylenically unsaturated monomers. Typical of such salt forms are the chloride, sulfate, nitrate, carbonate, bicarbonate and phosphate salt forms of the anion exchanger. The chloride form is preferred since it can be readily regenerated with NaCl.

The quaternary anion exchangers available are generally supplied in the form of chloride salt, so that, for this process they may be used without regeneration. On subsequent cycles, if the chloride form is desired, regeneration can be effected using a 10% aqueous NaCl solution. Anion interchange is, of course, known, and if it is desired to use the sulfate form, the chloride form can be converted to the sulfate form by treatment of the resin with sodium sulfate. All these various transformations are well-known to those skilled in the art.

It has been further found, most unexpectedly, that the substantially water-free or anhydrous form of the resin also effectively removes moisture as well as inhibitor. Since the anhydrous form absorbs moisture tenaciously, any traces of water present in the monomer are removed by contact with the resin. Of course, the water which is thus removed is an amount which does not exceed the saturation point of a particular monomer at room temperature. By way of illustration of this point, a typical situation is shown in Example VIII below, in which ethyl acrylate is the monomer; the water which the monomer contains or is in contact with at this saturation point in that instance is 1.47%.

The term "macroreticular structure" as hereinafter and hereinbefore used in the specification, examples and the claims refers to a unique porous structure. It has been found that this structure is developed when monoethylenically unsaturated monomers are copolymerized with polyvinyl monomers in the presence of certain compounds. Characteristic of these compounds is the fact that each is a solvent for the monomer mixture being copolymerized and exerts essentially no solvent action on said copolymer. For ease of reference hereinafter, such a compound will be termed "precipitant."

The anion exchange resin containing tertiary amine and quaternary ammonium groups prepared using said macroreticular-structured copolymer as intermediates also exhibit unusual and unexpected properties. These copolymer beads are converted to a quaternary anion exchanger by treatment in the well-known fashion with chloromethyl ether and subsequent amination with a tertiary amine. Trimethylamine is commonly used.

The tertiary amine type anion exchanger is prepared by treating the chloromethylated copolymer with a secondary amine, such as dimethylamine.

It is necesary that the precipitants form a homogeneous solution with the monomer. Further requirements are that the precipitants must be capable of exerting no solvent action on or being imbibed by the copolymer to any appreciable extent or the aforesaid unique properties will not be obtained in the copolymers produced. An additional requirement is that the precipitants must be chemically inert under the polymerization conditions; that is to say, they must not react chemically with any of the reactants or the suspending medium if one be used. A preferred class of precipitants are those which are liquid under the polymerization conditions.

The determination of the most effective precipitant and the amounts required for the formation of a particular copolymer with macroreticular structure may vary from case to case because of the numerous factors involved. However, although there is no "universal" or single class of precipitants applicable to all cases, it is not difficult to determine which precipitants will be effective with a given monomer system. The requirements of solubility with the monomer mixture and nonsolubility in the copolymer can be tested empirically and the solubilities of many monomers and copolymers are well-known from publications and textbooks.

Cross-linked copolymers are generally insoluble, but they will absorb or imbibe liquids which may be considered as being good "solvents." By immersing the cross-linked copolymer in liquids and determining the degree of swelling, a suitable precipitant can be chosen. Any liquids which are solvents for the monomer mixture, which give negligible swelling of the copolymer, which are chemically inert under polymerization conditions and which are substantially insoluble in the suspending medium, if one be used, will function as precipitants.

As a further guide in the selection of a suitable precipitant, reference may be made to scientific literature, for instance, as discussed in Hildebrand and Scott, Solubility of Non-Electrolytes, 3d. ed., N.Y., 1950. In general, it may be stated that sufficiently wide differences in the solubility parameters of polymer and solvent, respectively, must exist for the precipitant to be effective; and that, once an effective precipitant has been located, the behavior of many other liquids may be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogeneous when some components are present only in minor amounts; but if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 30% and 60% of the total weight of the monomer mixture and the precipitant.

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is known as "phase separation." As the concentration of monomer in the polymerizing mass decreases due to polymerization, and as the concentration of the resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins," page 45 et seq., John Wiley & Sons, Inc., 1958). While said channels are relatively small in the commonly thought of sense, they are large when compared with the micropores hereinbefore referred to. Thus, as set forth hereinafter, the use of a precipitant results in the formation of an unusual and desirable macroreticular structure. It is postulated that this "liquid expulsion" phenomenon and the resulting macroreticular structure is responsible for the unusual and unexpected properties of the resultant copolymer. Since the rigidity of the polymer mass at the time of precipitant expulsion is important, it is not surprising that the desirable properties obtained increase with increasing polyvinylidene content, i.e. increasing degrees of cross-linking. As a specific example, using a sulfonated styrene-divinylbenzene copolymer, the process of the present invention is appreciably less effective below about 4% to 6% divinylbenzene content in the copolymer than it is at higher divinylbenzene levels. With this specific system, a range of divinylbenzene content from about 2% to about 55% will give the desired effect.

Precipitants suitable for the styrene-divinylbenzene copolymers which are preferred as intermediates for the sulfonic acid cation exchange resin catalysts of the present invention include alkanols with a carbon content of from 4 to 10, such as n-butanol, sec-butanol, tert-amyl alcohol, n-hexanol, and decanol. Higher saturated aliphatic hydrocarbons, such as heptane, isooctane, and the like can also function as precipitants. in these systems.

A typical preparation of a macroreticular-structured quaternary anion exchange resin is as follows:

A mixture of styrene (121.6 grams) technical divinylbenzene (38.4 grams containing 50% active ingredient), 87 grams of tertiary amyl alcohol and 1 gram of benzoyl peroxide was charged to a solution of 6.5 grams of sodium chloride and 0.5 gram of the ammonium salt of a commercial styrene-maleic anhydride copolymer in 174 grams of water. The mixture was agitated until the organic components were dispersed as fine droplets and then heated to 86° to 88° C. for six hours.

The resultant polymer pearls were filtered and washed with water and freed from excess water and amyl alcohol by drying at elevated temperature. The product was obtained in the form of white opaque spherical or spheroidal beads amounting to 145 grams. When the dried product was dropped into a fluid such as hexane, fine bubbles were seen to rise from the immersed particles due to displacement of air held within the void spaces of the resin by the organic fluid.

These beads were chloromethylated and aminated in the well-known fashion as set forth in U.S. 2,629,710. To get a Type I quaternary, a tertiary amine must be used for amination, and trimethylamine is commonly employed. To get a Type II quaternary, dimethylaminoethanol is most commonly used.

A tertiary amine resin is prepared by amination of the chloromethylated copolymer with a secondary amine, such as dimethylamine. This reaction is well-known to those skilled in the art and represents no part of the present invention.

In carrying out the process of the present invention, the salt form of the anion exchanger can be used in either a batch or a continuous process. Both these terms are well-known to those skilled in the art and a continuous process represents the preferred embodiment of this invention. In a continuous process, the salt form of the resin in bead or granular form is charged to a column. It is generally desirable to backwash the resin in order to effect classification of the bed, and water can be used for this backwashing operation. The resin at this point may contain 40% to 60% water, and it is preferred to remove this by washing the resin, preferably downflow, with a water extracting solvent, such as methanol. Ethanol or dioxane can also be used, but methanol is preferred from an economic standpoint. The monomer containing dissolved inhibitor is then fed to the column or bed downflow until the desired breakthrough point in the effluent is obtained. While it is possible to elute the adsorbed inhibitor with an aqueous sodium chloride solution, the preferred method is to elute it with methanol. This is preferred because if the inhibitor is eluted with an aqueous sodium chloride solution, then it is still necessary to use a dehydrating solvent, such as methanol, in order to condition the bed for the next cycle. Although this column or bed technique is always referred to in ion exchange as a continuous process, it will be seen that it is actually not truly continuous since it is necessary to stop the monomer feed in order to regenerate the bed. A closer approach to a continuous process can be obtained by using two or more columns, one being operated while the other is being regenerated. This is also a process that is well-known in the art.

The temperature at which the inhibitor removal is effected is not a critical factor, inasmuch as the reaction rate is very rapid with these macroreticular resins. The temperature employed also depends on the boiling point of the monomer, since it is desired to effect the removal with the monomer in the liquid state. Temperatures from 0° to 60° C. can be employed, although the examples cited were run at ambient temperature which would be from 20° to 30° C.

Typical of the inhibitors which can be removed using the salt form of the macroreticular-structured tertiary amine and quaternary ammonium anion exchanger are the following:

t-Butyl catechol,
Hydroquinone,
The monomethyl ether of hydroquinone,
p-Phenylene diamine,
Di-t-butylhydroquinone,
Picric acid,
1,4-naphthoquinone,
4-amino-1-naphtho-p-hydroxydiphenylamine,
p-Hydroxyphenylamine,
4,6-dinitro-o-cresol,
2,6-di-isopropyl-o-cresol,
3,6-dimethoxyphenol,
o-Nitrophenol, and
o-Phenylphenol.

A wide variety of inhibitors can be removed using the process of this invention, but the above-noted inhibitors are those more commonly used in commerce.

Since the anion exchange resins are insoluble in solvents by virtue of cross-linking, a wide variety of monomers can be treated for inhibitor removal. Typical of these are the alkyl and aryl acrylates, methacrylates, and ethacrylates and the vinyl compounds, such as styrene, α-methylstyrene, ethyl styrene, vinyl toluene, vinyl chloride, vinylidene chloride, vinyl stearate, divinylbenzene, trivinylbenzene and vinyl naphthalene.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

In the examples which follow, Resin A was prepared by suspension copolymerizing a styrene-20% divinylbenzene monomer mixture dissolved in tert-amyl alcohol. The carbinol represented 45% of the total weight of the monomer solution. This copolymer was subsequently chloromethylated and aminated with trimethylamine. This is known as a Type I quaternary ammonium anion exchange resin.

Resin B was prepared by copolymerizing the styrene-20% divinylbenzene monomer mixture dissolved in tert-amyl alcohol, the carbinol being 33% of the total weight of the monomer solution. This copolymer was subsequently chloromethylated and aminated in the conventional manner using dimethylaminoethanol as the aminating agent. This is known as a Type II quaternary ammonium anion exchange resin.

Resin F is a tertiary amine anion exchange resin, and was prepared by the chloromethylation of a styrene 3% divinylbenzene extended with 45% methyl isobutyl carbinol and amination with dimethylamine.

In some of the examples which follow, the inhibitors are designated by their commonly used abbreviations; thus:

HQ = hydroquinone,
MEHQ = monomethyl ether of hydroquinone,
TBC = t-butylcatechol, and
PHDA = para-hydroxyphenylamine.

EXAMPLE I

Two 50 ml. burette columns were set up containing 25 ml. of chloride form hydrated A and B resins. The resins were treated with an excess of aqueous NaCl and then pre-conditioned with methanol. The resins were then exhausted with ethyl acrylate (EA) monomer containing 1000 p.p.m. HQ using a 0.5 gal./cu. ft./min. flow. Total bed volume treated to breakthrough and average leakage were then compared for the two resins. The resins were put through a second exhaustion cycle after 6 bed volumes regeneration using methanol. Regeneration was performed at 0.5 gal./cu. ft./min. flow. HQ leakage was determined by colorimetric detection of HQ in aqueous caustic extracts of treated monomer fractions. The results of the experiment appear in Table I:

Table I

COMPARATIVE DATA FOR THE ADSORPTION OF HYDROQUINONE FROM A AND B RESINS

| | Resin A | Resin B |
|---|---|---|
| Ml. resin/bed | 25 | 25 |
| HQ conc. in EA infl. (p.p.m.) | 1,000 | 1,000 |
| Flow rate (gal./cu. ft./min.) | 0.5 | 0.5 |
| B.V. treated to breakthrough (1st cycle) | 28 | 22 |
| B.V. treated to breakthrough (2d cycle) | 25 | 20 |
| Average HQ leakage (p.p.m.) | <1 | <1 |
| Average HQ adsorbed (millimoles/ml. resin) | 0.223 | 0.117 |
| Resin volume capacity (meq./ml.) | 0.72 | 0.94 |

EXAMPLE II

Two 50 ml. burette columns were set up containing 25 respectively A and B resins. The resins were then conditioned as in Example I. Exhaustion of the resins was performed using ethyl acrylate (EA) monomer containing 200 p.p.m. MEHQ at the usual 0.5 gal./cu. ft./min. flow rate. Total bed volumes treated and average MEHQ leakage were determined. A 6-bed volume methanol regeneration was performed following exhaustion of the resin and a second exhaustion run completed. Treated EA fractions were analyzed colorimetrically for MEHQ after reacting the fraction with fixed amounts of glacial acetic acid and sodium nitrite solutions. The results of the tests appear in Table II:

Table II

COMPARATIVE DATA FOR THE ADSORPTION OF MEHQ FROM EA BY A AND B RESINS

| | Resin A | Resin B |
|---|---|---|
| Ml. resin/bed | 25 | 25 |
| MEHQ conc. in EA infl. (p.p.m.) | 200 | 200 |
| Flow rate (gal./cu. ft./min.) | 0.5 | 0.5 |
| B.V. treated to breakthrough (1st cycle) | 20 | 12 |
| B.V. treated to breakthrough (2d cycle) | 19 | 10 |
| Average MEHQ leakage (p.p.m.) | 1 | 1 |
| Average MEHQ adsorbed (millimoles/ml. resin) | 0.026 | 0.015 |
| Resin volume capacity (meq./ml.) | 0.72 | 0.94 |

EXAMPLE III

A column of Resin A was employed for the removal of 100 p.p.m. HQ from methyl methacrylate (MMA). The column was first backwashed with a 10% aqueous sodium chloride solution to insure complete conversion to the chloride form, then back washed with 16 bed volumes of deionized water to remove any residual sodium chloride, and the water was then displaced with 8 bed volumes of ethanol (benzene-denatured) at 0.5 g.p.m./ft.$^3$. The MMA monomer containing 100 p.p.m. HQ was fed to the top of the column at a rate of 0.5 g.p.m./ft.$^3$. The HQ was removed completely in the initial cycle from 100 p.p.m. to less than 1 p.p.m. The end point was taken when the HQ content of the cumulative effluent reached 2 p.p.m. In the first cycle, 210 bed volumes of MMA were treated and 220 bed volumes in the second cycle.

EXAMPLE IV

Employing the procedure of Example III, and the same criterion for end point, an ethyl acrylate monomer containing 15 p.p.m. HQ was fed to the column. Seven hundred and twenty bed volumes were treated in the first cycle before breakthrough, 500 on the second, 500 on the third, 400 on the fourth, and 550 on the fifth.

EXAMPLE V

This example clearly shows the marked superiority of macroreticular-structured anion exchangers for the removal of inhibitors from monomers. Resin C is a "conventional" so-called "porous" resin which was prepared by copolymerizing styrene with 1% divinylbenzene, and subsequently chloromethylating the copolymer and aminating with trimethylamine. It was used as the chloride salt.

Resin D was prepared by copolymerizing styrene with 20% divinylbenzene in the presence of 45% t-amyl alcohol and subsequently chloromethylating and aminating with trimethylamine. Resin E was prepared by copolymerizing styrene with 10% divinylbenzene in the presence of 40% n-butanol and subsequently choloromethylating and aminating with trimethyl amine. Since it is well-known in ion exchange technology that the so-called "porosity" is inversely proportional to the degree of cross-linking, it would be expected that Resin C, with 1% divinylbenzene, would be much more porous than Resins D and E. Using the techniques set forth in the previous examples, the methyl methacrylate monomer was passed through the columns at a rate of 1 gal./min./cu. ft. The results of these tests are shown in Table III:

*Table III*
BED VOLUMES TREATED (NO DETECTABLE LEAKAGE)

|  | Inhibitor feed conc., .006% HQ | Inhibitor feed conc., .01% MEHQ |
|---|---|---|
| Resin C | 50 | 0 |
| Resin D | >161.9 | 18 |
| Resin E | >161.7 | 24 |

These data prove conclusively that the so-called "conventional" resins, even though previously considered to be "porous," are markedly less effective in removing inhibitors from monomers than are the macroreticular-structured copolymers.

EXAMPLE VI

A 50 ml. burette column was set up containing 25 ml. of Resin A. After backwashing the resin (classification), 5 bed volumes of methanol were passed downflow through the column to displace water from the bed. Styrene monomer containing 10 p.p.m. TBC was passed downflow through the column. A total of 16 bed volumes of treated styrene were collected, in addition to a sweetening-off bed volume. The flow rate was maintained at 1 gal./cu. ft./min. throughout.

The 16th bed volume was tested for t-butyl catechol, but a negative test was obtained. The test t-butyl catechol consists of adding an equal volume of 0.5 n NaOH to the treated styrene, and agitating the mixture for approximately five minutes. If TBC is present in quantities greater than 1 p.p.m. the aqueous phase will exhibit a light pink coloration.

EXAMPLE VII

A column of Resin A was classified by backwashing with water, and then treated with methanol to remove the water and then pre-conditioned with 3 bed volumes of Solvesso #150 (an aromatic hydrocarbon). A solution of lauryl methacrylate, 30% solids in Solvesso #150 and containing 0.35% by weight of p-hydroxydiphenylamine as inhibitor was passed downwardly through the column. The effluent after 4 bed volumes contained 0.09% by weight of PHDA, and much of the color of the original solution had been removed. The influent was dark brown in color, while the effluent was a very light orange. At the cessation of the run, the resin was eluted with methanol, and at least some of the color which the resin had absorbed was eluted by the alcohol.

EXAMPLE VIII (1) 25 ml. of oven-dried Resin A (dried 16 hours at 75° C. and <1 mm. Hg) was placed in a 50 ml. burette column;

(2) Ethyl acrylate monomer containing 200 p.p.m. MEHQ, saturated with $H_2O$ (1.47% $H_2O$ by K. Fischer titration) was passed through the resin at 0.5 gal./cu. ft./min. flow rate;

(3) Single bed volumes of effluent were collected and tested for moisture content (K. Fischer) and qualitatively for MEHQ (a distinct color is discerned when glacial acetic acid and $NaNO_2$ added to a sample; a few p.p.m. MEHQ can easily be detected).

RESULTS

| B.V. effluent | Percent $H_2O$ content | MEHQ (qual. test) |
|---|---|---|
| 1 | [1] Trace | Negative. |
| 2 | [1] Trace | Do. |
| 3 | [1] Trace | Positive. |
| 4 | [1] Trace | Do. |
| 5 | 0.25 | Do. |
| 6 | 0.83 | Do. |
| 7 | 0.95 | Do. |
| 8 | 0.87 | Do. |

[1] Note: less than 1 drop of K. Fischer reagent (5.21 mg. $H_2O$/ml.) required for a 0.6 g. monomer sample; therefore, <0.01% $H_2O$.

EXAMPLE IX

A 50 ml. burette column was loaded with 25 ml. of Resin E in the hydrochloride form. The resin was exhausted at 0.5 gal./cu. ft./min. flow rates (4 bed volumes (B.V.)/hour) The influent solutions consisted of ethyl acrylate monomer containing 1000 p.p.m. HQ, ethyl acrylate containing 200 p.p.m. MEHQ and divinylbenzene containing 1200 p.p.m. TBC. Breakthrough was established by analyzing the effluents for inhibitor leakage to a value below 10 p.p.m. In all cases, a very sharp inhibitor increase in the effluent was noted at breakthrough.

The treated ethyl acrylate and divinylbenzene fractions were analyzed colorimetrically for the inhibitors. The HQ and TBC were determined from the color imparted to aqueous caustic extracts. MEHQ was detected by reacting the fractions with glacial acetic acid and sodium nitrite solutions. The results of these tests are shown in Table IV.

*Table IV*
COMPARATIVE DATA FOR THE ADSORPTION OF HQ, MEHQ AND TBC FROM MONOMERS

| Resin | Form | HQ sorption | | MEHQ sorption | | TBC sorption | |
|---|---|---|---|---|---|---|---|
| | | B.V. treated | M.moles HQ/ml. resin | B.V. treated | M.moles MEHQ/ml. resin | B.V. treated | M.moles TBC/ml. resin |
| Resin F | HCl | 36 | 0.302 | 12 | 0.016 | 47 | 0.396 |

We claim:
1. A process for the removal of hydroquinone, catechol, amine and phenolic polymerization inhibitors from ethylenically unsaturated monomers selected from the group consisting of alkyl and aryl acrylates, methacrylates, and ethacrylates and the vinyl compounds of the class consisting of styrene, α-methylstyrene, ethyl styrene, vinyl toluene, vinyl chloride, vinylidene chloride, vinyl stearate, divinylbenzene, trivinylbenzene and vinylnaphthalene, the said monomers not being in contact with an amount of water that exceeds their saturation point at room temperature, which process comprises contacting said inhibitor-containing monomers with the salt form of a substantially anhydrous macroreticular-structured anion exchange resin selected from the group consisting of quaternary ammonium and tertiary amine anion exchange resins, said salt being selected from the group consisting of chloride, sulfate, nitrate, carbonate, bicarbonate and phosphate.

2. A process as set forth in claim 1 in which the salt form is the chloride.

3. A process for the removal of hydroquinone, catechol, amine and phenolic polymerization inhibitors from polymerizable monomers selected from the class consisting of alkyl and aryl acrylates, methacrylates, and ethacrylates, and the vinyl compounds of the class consisting of styrene, α-methylstyrene, ethyl styrene, vinyl toluene, vinyl chloride, vinylidene chloride, vinyl stearate, divinylbenzene, trivinylbenzene and vinylnaphthalene, the said monomers not being in contact with an amount of water that exceeds their saturation point at room temperature, which process comprises contacting said inhibitor-containing monomers with the salt form of a substantially anhydrous macroreticular-structured quarternary ammonium anion exchange resin, said salt being selected from the group consisting of chloride, sulfate, nitrate, carbonate, bicarbonate and phosphate.

4. A process for the removal of hydroquinone, catechol, amine and phenolic polymerization inhibitors from polymerizable monomers selected from the class consisting of alkyl and aryl acrylates, methacrylates, and ethacrylates and the vinyl compounds, of the class consisting of styrene, α-methylstyrene, ethyl styrene, vinyl toluene, vinyl chloride, vinylidene chloride, vinyl stearate, divinylbenzene, trivinylbenzene and vinylnaphthalene, the said monomers not being in contact with an amount of water that exceeds their saturation point at room temperature, which process comprises contacting said inhibitor-containing monomers with the salt form of a substantially anhydrous macroreticular-structured tertiary amine anion exchange resin, said salt being selected from the group consisting of chloride, sulfate, nitrate, carbonate, bicarbonate and phosphate.

5. A process for simultaneously removing hydroquinone, catechol, amine and phenolic polymerization inhibitors and dehydrating water contained in polymerizable monomers selected from the group consisting of alkyl and aryl acrylates, methacrylates, and ethacrylates and the vinyl compounds of the class consisting of styrene, α-methylstyrene, ethyl styrene, vinyl toluene, vinyl chloride, vinylidene chloride, vinyl stearate, divinylbenzene, trivinylbenzene and vinylnaphthalene, the said monomers having at least a trace of water but not being in contact with an amount of water that exceeds their saturation point at room temperature, which process comprises contacting said monomer with the salt form of a substantially anhydrous macroreticular-structured anion exchanger selected from the group consisting of quaternary ammonium and tertiary amine anion exchange resins said salt being selected from the group consisting of chloride, sulfate, nitrate, carbonate, bicarbonate and phosphate.

References Cited by the Examiner

UNITED STATES PATENTS

| | | | |
|---|---|---|---|
| 2,888,494 | 5/1959 | Kissling | 260—12.1 X |
| 3,017,426 | 1/1962 | Ruffing | 260—465.9 |
| 3,022,259 | 2/1962 | Pearce | 260—2.1 X |
| 3,037,052 | 5/1962 | Bortnick | 260—485 |

OTHER REFERENCES

Anderson: Ind. and Eng. Chem., vol. 47, pages 71–72 (1955).

Samuelson: Ion Exchangers in Analytical Chemistry, pp. 93–95 (1953).

Wheaton: Ind. and Eng. Chem., vol. 43, pages 1088–1093 (1951).

LORRAINE A. WEINBERGER, *Primary Examiner.*

LEON ZITVER, *Examiner.*